United States Patent [19]

Bauer

[11] Patent Number: 4,511,927
[45] Date of Patent: Apr. 16, 1985

[54] LIQUID COUPLING SYSTEM FOR VIDEO PROJECTORS

[75] Inventor: Michael T. Bauer, Welborn, Fla.

[73] Assignee: National Viewtech Corp., Patchogue, N.Y.

[21] Appl. No.: 456,806

[22] Filed: Jan. 10, 1983

[51] Int. Cl.³ .......................... H04N 5/72; H04N 5/65; H04N 5/74
[52] U.S. Cl. ..................................... 358/250; 358/245; 358/231; 250/505.1; 250/515.1; 252/478; 378/203
[58] Field of Search ............... 358/250, 245, 253, 247, 358/231, 237, 64; 250/505.1, 515.1; 252/478; 378/203

[56] References Cited

U.S. PATENT DOCUMENTS

| | | | |
|---|---|---|---|
| 2,342,778 | 2/1944 | Wolff | 358/242 |
| 3,632,873 | 11/1972 | Henkin | 358/251 |
| 4,151,554 | 4/1979 | Tucker | 358/64 |
| 4,366,252 | 12/1982 | Weaver | 252/478 |
| 4,405,949 | 9/1983 | Hockenbrock et al. | 358/237 |

Primary Examiner—Howard W. Britton
Assistant Examiner—John K. Peng
Attorney, Agent, or Firm—Leonard Belkin

[57] ABSTRACT

A liquid coupling system for a video projector having a liquid in intimate contact with a CRT screen and the first lens element of the lens arrangement. The liquid is optically transparent and performs the additional function of absorbing heat and x-rays emanating from the CRT.

5 Claims, 6 Drawing Figures

FIG. 3
FIG. 3a
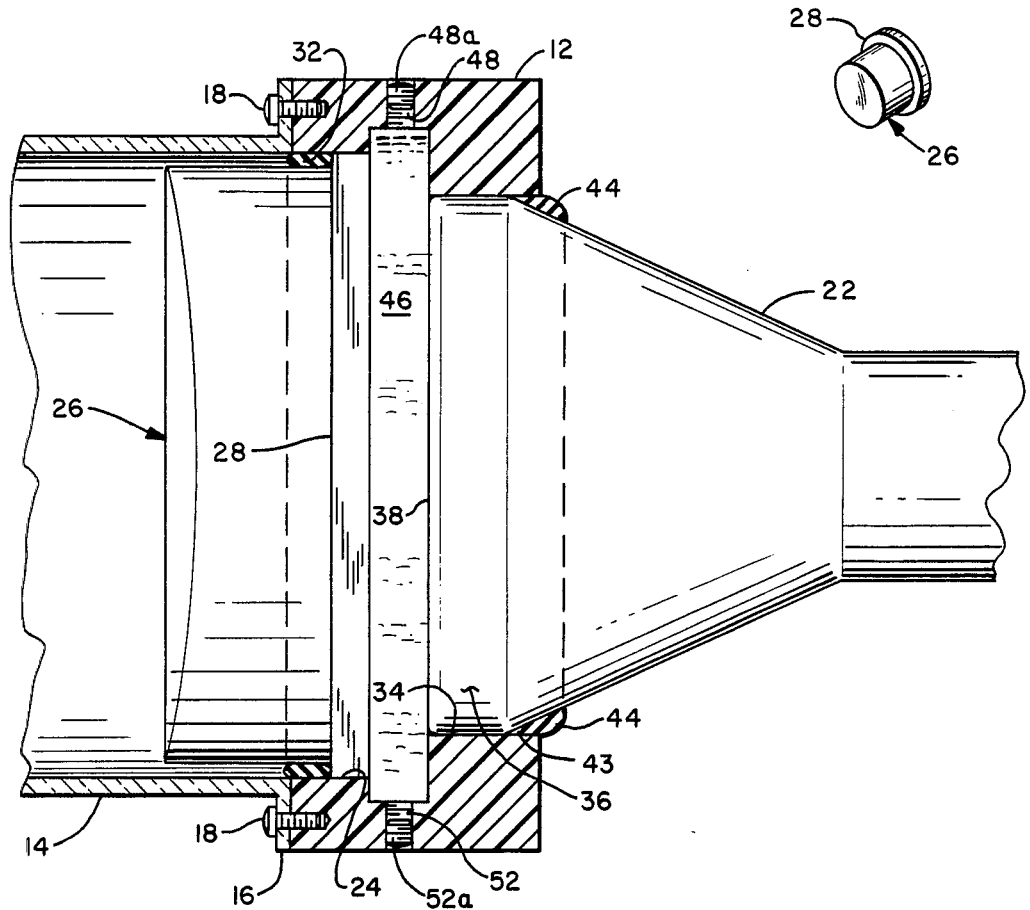
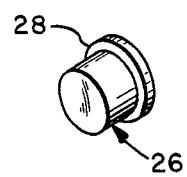
FIG. 5
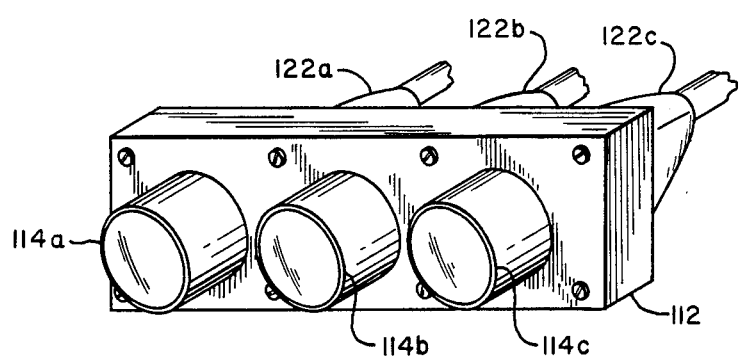
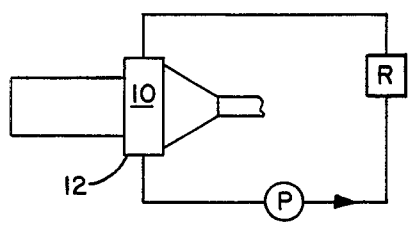
FIG. 4

LIQUID COUPLING SYSTEM FOR VIDEO PROJECTORS

BACKGROUND OF THE INVENTION

The present invention relates to a liquid coupling system for video projectors and more particularly to a liquid system for coupling a CRT to a projection lens in a video projector in which enhanced brightness and contrast are obtained without accompanying increases in x-ray emissions.

There has developed substantial interest during the past few years in big screen projection of television images. In one common type of projection system, the images are projected on a screen from the face of a CRT through a lens system. In the case of color, three separate CRT's are employed, one for each primary color, and projection is through a lens system for each CRT and the pictures converge on the screen. Typically, the screen would be in a darkened room or theater as the amount of light available for projection is dependent on the brightness of the CRT's.

With the increasing popularity of projection television there has been accompanying interest in the use of large screen TV, or projection TV, in surroundings other than theaters where it is not possible, convenient, or desirable to darken the premises.

Examples of such surroundings are in homes and other non-theater locations during daylight hours or in reception areas of public places, such as hotel lobbies and the like.

Because of ambient lighting conditions in the surroundings described above, existing video projection systems tend to produce screen images which are not as bright as they should be and this condition tends to limit the growth in use of video projection systems.

Alternate types of systems are available, such as light-/valve, but they usually are much more expensive.

As pointed out earlier, in present acceptable methods of video projection, the CRT is interfaced to a projection lens which projects the image. The brightness of the resulting image is limited by several factors, including screen reflectivity, CRT-to-lens coupling medium, lens light transmission characteristics, and the energy level applied to the CRT, that is, the brightness displayed on the television screen.

Screens in use today are highly reflective in nature and it does not appear that much improvement in brightness can be obtained by making further changes in screen technology. Similarly, it appears that the present use of good quality lens systems precludes improvements in this area as well.

Hence, the remaining two variables in the video projection system, namely, coupling medium and energy level applied to the CRT, have drawn the attention of workers in the field interested in increasing the brightness and improving the contrast displayed on the large screen.

It has been demonstrated that using a liquid such as ethylene glycol or water and glycerine to couple the CRT to the lens does improve brightness and contrast as well as provide a medium for heat dissipation. When the energy level of the CRT is increased, the level of brightnes on the face of the tube is increased which results in greater brightness on the large screen as well as additional heat to be dissipated.

Thus, substantial increases in the CRT energy level appear to be the most direct and effective means of improving in projection systems screen brightness to a point where the result is acceptable under the conditions described above.

Unfortunately, it has been discovered that these increases in CRT energy level generate more heat than can be accomodated by the aforementioned liquid couplings, and furthermore, produce unacceptable levels of x-ray emissions. Efforts to negate these effects include forced air cooling and the use of doped faceplates to absorb or attenuate the x-ray emissions.

The approach described above adds substantially to the cost and bulkiness of the video projections system as well as raising reliability problems over a long period of use due to possible failure of the forced air cooling system, build up of dust over a period of time causing static charges to develop, as well as other problems.

Efforts have been made to improve liquid coupling to avoid the use of forced air cooling but these have not been notably successful because existing systems use separately sealed lenses and liquid cells to avoid leaking. As a result, there is present an air gap which limits the improvement in brightness which can be obtained. Also, there is a tendency for dust to build up in air gaps causing attenuation of the light passing therethrough.

SUMMARY OF THE PRESENT INVENTION

The present invention overcomes or reduces many of the present problems in existing video projection systems by permitting CRT energy levels to be raised substantially for the purpose of improving projection screen brightness and contrast while at the same time avoiding excessive x-ray emissions and eliminating the need for any air gap between the lens and liquid coupling system.

In the present invention, this is accomplished by providing a totally sealed liquid coupling between the face of the CRT and the first element of the lens system. The liquid selected for the coupling is one which has the properties of excellent light transmission, heat dissipation, and x-ray shielding, and retains these properties for a substantial period of time. Liquids which have been found to have all of these properties in sufficient degree to perform adequately as the liquid coupling in this invention are generally heavy, having an atomic number in excess of 17, and include substantially saturated, aqueous solutions of barium chloride ($BaCl_2$), strontium chloride ($SrCl_2$), and barium iodide ($BaI$).

In a preferred embodiment of this invention, there is provided a coupling cell of solid material, a lens barrel containing projection lenses attached to one surface of the cell and a first recess in the cell within the barrel to accomodate a lens element within the barrel. A second recess in the cell on an oppositely facing surface of the cell is also provided, with a CRT having its screen surface within the second recess. A liquid chamber is formed within the cell communicating with both of the recesses, and when filled with liquid the latter is in direct contact with the lens element and the screen surface of the CRT. The liquid is optically transparent and has the ability to absorb x-rays emanating from the screen surface of the CRT.

The CRT and the lens element mounted in the recesses are provided with perimeter seals against liquid leakage.

There is thus provided an uninterrupted optical path from the screen surface of the CRT through the projection lens system free of all air gaps.

The above described system makes it possible to increase the anode voltage within the CRT in order to increase substantially the brightness of the CRT screen while at the same time dissipating the heat generated in the phosphorous coating within the screen of the CRT and absorbing the x-rays emanating therefrom.

An additional advantage of this arrangement is that there is reduced attenuation of the light as it passes through the projection system and there is an improvement in contrast on the reflective, large screen.

It is thus a principal oject of this invention to provide an improved system for increasing the brightness and contrast of images on a reflective screen in a video projection system.

Other objects and advantages of this invention will hereinafter become obvious from the following description of preferred embodiments of this invention.

BRIEF DESCRIPTION OF THE DRAWINGS

FIG. 3 is a view along 3—3 of FIG. 2.

FIG. 3a shows an isometric view of lens element 26.

FIG. 4 shows schematically an arrangement for circulating and rejecting heat in the coupling liquid.

FIG. 5 is an isometric view of an adaptation of the apparatus shown in FIGS. 1–3 to a three CRT system which typically would be employed with a color video display.

DESCRIPTION OF THE PREFERRED EMBODIMENTS

Figure 1:
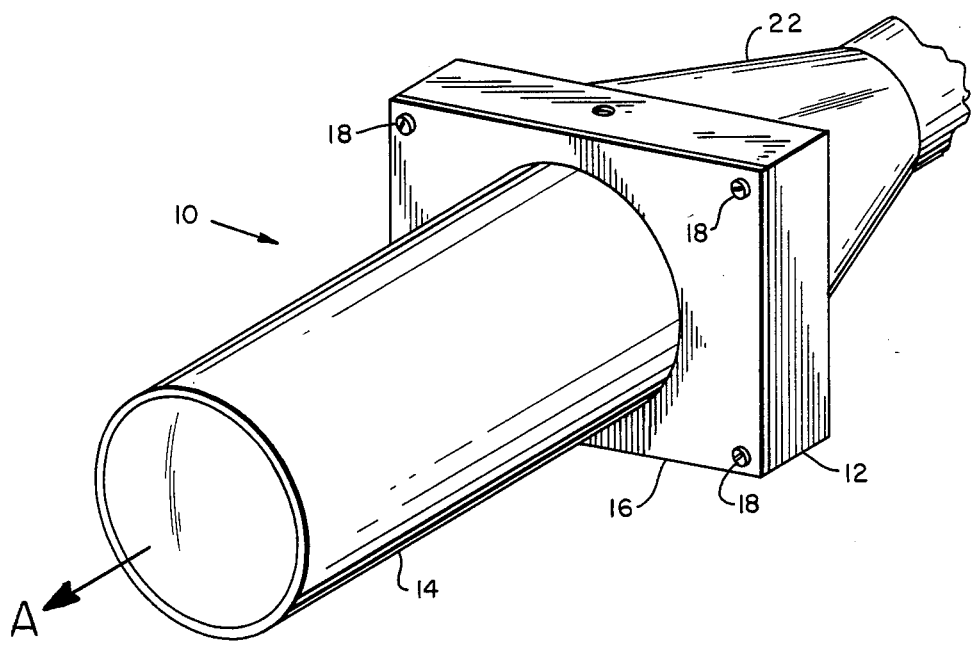
FIG. 1 is an isometric view of apparatus for coupling a CRT to a lens projection system embodying the principles of this invention, in a preferred embodiment.

Referring to FIG. 1, coupling system 10 consists of a cell 12 of transparent material having mounted on one face a lens barrel 14 with flange 16 for attachment to cell 12 through the use of screws 18 or other convenient attaching means.

As is understood in the art, lens barrel 14 contains an arrangement of lens elements designed to transmit and amplify an image or images on a screen (not shown) as indicated by arrow A.

On the oppositely facing side of cell 12 is mounted a cathode ray tube (CRT) 22 with its display screen surface embedded in cell 12 in a manner about to be described. It is seen that the light and images appearing on the surface of the CRT would upon proper coupling be transmitted through cell 12, into lens barrel 14, and out in the direction shown by arrow A, to be displayed on the large screen.

Figure 2:
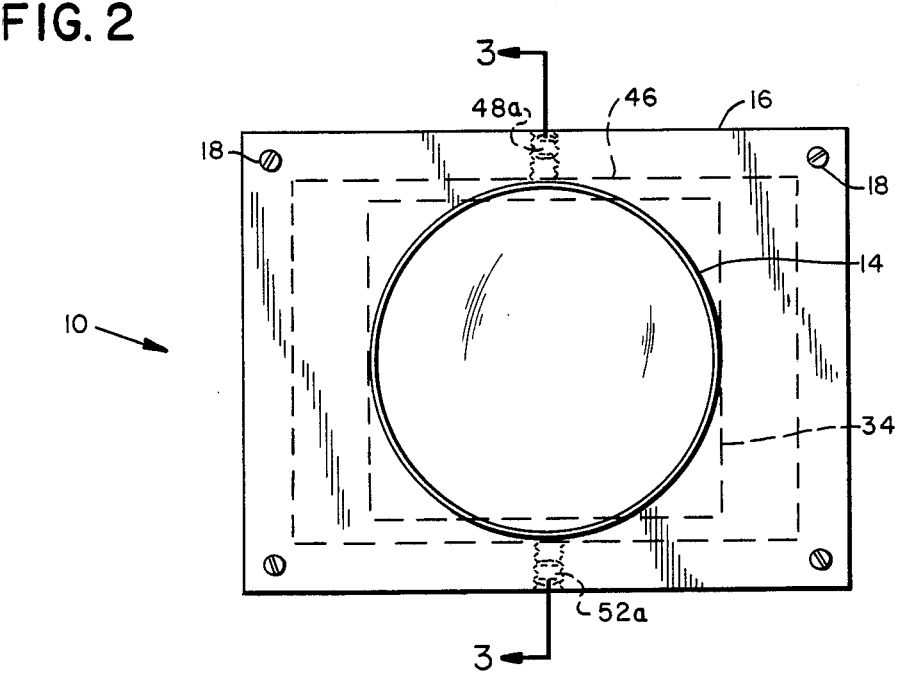
FIG. 2 is a front elevation view of the apparatus shown in FIG. 1.

For details of the construction of coupling system 10, reference is made to FIGS. 2 and 3 where it is seen that cell 12 is provided with a circular recess 24 on the surface on which lens barrel 14 is mounted. The rear lens element 26, a plano-concave lens, in barrel 14 is mounted within recess 24 as illustrated. It is seen that element 26 is circular in cross section to conform to barrel 14 and is provided with a shoulder 28 which conforms closely to the inner surface of recess 24. The purpose of shoulder 28 is to form a space between the body of lens element 26 and recess 24 into which a sealant 32 can be inserted to prevent any liquid leakage. Sealant 32 may be any suitable material and the material known as Silastic, a silicone rubber, has been found to be satisfactory. While not shown, it is understood that a stop at the bottom of recess 24 may be provided to assist in the proper positioning of lens element 26.

On the oppositely facing surface of cell 12 is provided a recess 34 whose shape would conform to the shape of the outer rim 36 of CRT 22. In this construction, the screen surface 38 of CRT 22 is rectangular so that recess 34 will have this same shape. It will be noted that the depth of recess 34, and hence the thickness of cell 12 is such as to provide an annular space 43 between the slope of the CRT 22 and recess 34. The purpose of annular space 42 is to accomodate a sealing material 44 to prevent liquid leakage, the material being the same or similar to the material used for sealant 32.

Between recesses 24 and 34 in cell 12 is provided a cavity or chamber 46 communicating with both of the aforementioned recesses. Chamber 46 would be provided with a threaded fill hole 48 and one or more discharge ports or holes 52, and when chamber 46 is filled with liquid, these holes would be closed with suitable members such as stopcocks, 48a and 52a, respectively.

In the use of the apparatus just described, chamber 46 would be filled with a suitable liquid which is optically transparent and has the characteristics of absorbing x-rays, which would be emanating from screen surface 38 of CRT 22. When the latter is operating, the images on surface 38 are transmitted through the liquid within chamber 46 and into lens barrel 14 through lens element 26, and projected onto a screen as described in connection with FIG. 1.

Due to the fact that there are no air gaps in this optical coupling arrangement, and because of the intimate contact between the liquid and the facing surfaces of screen 38 and lens 26, there is a very efficient transfer of light with a minimum of scattering and loss of current. It is understood that the depth of chamber 46 in the direction of light transmission can be adjusted to increase the amount of liquid present in accordance with the intensity of the x-rays to be emitted.

In addition, it has been found that the liquid within chamber 46, even when not being circulated and cooled has the ability to dissipate substantial amounts of heat thereby making it possible to step up the anode voltage within CRT 22 and provide more light on surface 38. For example, it was discovered that operating CRT 22 at a voltage of 40 kV as compared to a normal level in the range of 25 kV to 37 kV resulted in the liquid rising by only 3° C. and stabilizing at that level.

However, if desired, or if higher operating levels are to be attained, provision can be made to cool the liquid within chamber 46. This can be accomplished, as shown in FIG. 4, by utilizing a small electrically driven pump P and a small radiator R conveniently located to circulate the liquid and obtain positive cooling.

When the anode voltage in CRT 22 is raised in order to obtain the increase in brightness desired, there will be an increase in x-ray emissions from screen 38. One of the advantages of this invention is that it permits the selection of a liquid which is capable of absorbing these x-rays in addition to being transparent to light.

It is expected that liquids having an atomic number of at least 17 would be a candidate for this application, provided such liquids meet the other criteria, ie., optically transparent, stable and not subject to darkening over some period of time, as well as being compatible with the other parts of the system.

It has been discovered that substantially saturated aqueous solutions of the halides $BaCl_2$, $SrCl_2$, and $BaI$ all are completely satisfactory for use in this invention.

The following examples are illustrative of this invention.

With a cell containing a liquid chamber having a depth of about 1.7 mm., an anode voltage of 40 kV, and radiation in roentgens of 18 mR/hr. passing into the cell (ambient or background radiation being 0.01–0.02 mR/hr.) each of the substantially saturated solutions of $BaCl_2$, $SrCl_2$, and $BaI$ were used in turn.

In the case of $BaCl_2$, radiation in the range of 1.2–1.3 mR was emitted from the cell, in effect a 14.4:1 reduction in the level of x-rays.

In the case of $SrCl_2$, radiation leaving the cell was 0.04 mR/hr. for a 450:1 reduction.

For $BaI$, radiation emitted was 0.02–0.03 mR/hr. for a 1800:1 reduction.

Cell material was a solid transparent plastic acrylic. Specific gravities for the solutions were 1.28, 1.44, and 1.34, respectively.

For all cases brightness of the screen and contrast were substantially increased and more clearly noticeable. In addition, emitted x-rays using the above liquids at the elevated voltages were well within HEW requirements as to such emissions.

Other possible materials which could serve as the liquid in this invention, not yet tested, include lead acetate and diatrizoate meglumine buffered with sodium hydroxide.

In the above embodiment a plastic acrylic was employed for cell 12, and it was noted that if additional cooling was necessary a circulating system, such as that shown in FIG. 4, could be provided. A plastic member for cell 12 is light in weight and relatively inexpensive and thus ideally suitable for such an application.

Under some circumstances, however, it might be desirable to employ a metal, such as cast aluminum, as cell 12, to improve the ability to absorb and reject heat, because of the superior heat transfer characteristics of metal as compared to plastic. In such an arrangement, fins could also be used to further enhance the transfer of heat out of the system.

Application of the invention to a three CRT system is illustrated in FIG. 5. Cell 112 similar in construction to cell 12 described above is provided with three lens barrels 114a, 114b, and 114c and three CRT's 122a, 122b, and 122c. There are separate recesses and liquid coupling chambers for each coupling between a CRT and lens barrel, although a common chamber may be provided under some circumstances, or communication between chambers may be provided.

As is understood in the art, each CRT is monochrome, displaying one of the three primary colors and the three images are made to converge on the large screen to produce the final image in full color.

It is thus seen there has been provided a unique system for projecting video images at higher brightness and greater contrast without accompanying increases in x-ray emissions. The system is simple in construction, reliable in operation, and economical to make and operate.

While only certain preferred embodiments of the invention have been described it is understood that many variations thereof are possible without departing from the principles of this invention as defined in the appended claims.

What is claimed is:

1. Apparatus for optically coupling a projection lens to the face of a CRT comprising coupling cell means, lens means mounted on one side of said cell means, and a recess in said cell means to accommodate a lens element of said lens means, a recess formed on the oppositely facing side of said cell means to accommodate the screen surface of a CRT, a liquid chamber formed within said cell means for communicating with both said lens element and said screen surface of said CRT, coupling liquid having the ability to absorb x-rays being a substantially saturated solution of a halide selected from the group consisting of $BaCl_2$, $SrCl_2$, and $BaI$ filling said liquid chamber in intimate contact with said lens element and said screen surface, said liquid being optically transparent thereby providing an optical path from said screen surface through said lens element free of air gaps and means for sealing against liquid leakage the perimeters of said lens element and CRT in contact with said cell means.

2. The apparatus of claim 1 having means to circulate said liquid out of said chamber to reject heat accumulating in said liquid.

3. The apparatus of claim 1 in which said cell means is made from a solid, transparent material.

4. The apparatus of claim 1 in which said cell means is made from a metal to facilitate the transfer of heat from said liquid.

5. Apparatus for optically coupling a projection lens to the face of a CRT comprising coupling cell means, lens means mounted on one side of said cell means and a recess in said cell means to accommodate a lens element of said lens means, a recess formed on the oppositely facing side of said cell means to accommodate the screen surface of a CRT, a liquid chamber formed within said cell means for communicating with both said lens element and said screen surface of said CRT, coupling liquid filling said liquid chamber in intimate contact with said lens element and said screen surface, said liquid being optically transparent thereby providing an optical path from said screen surface through said lens element free of air gaps, and means for sealing against liquid leakage the perimeters of said lens element and CRT in contact with said cell means, said lens element having a body which is spaced from the inner wall of its recess and is provided with a shoulder adjacent the liquid chamber, said shoulder fitted closely to the inner wall of said recess, said sealing means including sealant in the space between the lens element body and the wall of its recess adjacent said shoulder.

* * * * *